United States Patent [19]

Coutant

[11] 4,423,644

[45] Jan. 3, 1984

[54] MULTI-SPEED PLANETARY DIFFERENTIAL

[75] Inventor: Alan R. Coutant, Chillicothe, Ill.

[73] Assignee: Caterpillar Tractor Co., Peoria, Ill.

[21] Appl. No.: 248,743

[22] Filed: Apr. 1, 1981

Related U.S. Application Data

[63] Continuation-in-part of Ser. No. 68,241, Aug. 20, 1979, abandoned.

[51] Int. Cl.³ .............................................. F16H 1/38
[52] U.S. Cl. ....................................... 74/710; 74/714; 74/762; 74/674; 74/665 GA
[58] Field of Search ......... 74/665 F, 665 GA, 665 H, 74/665 T, 694, 674, 705, 710, 710.5, 714, 762, 763, 720.5, 682

[56] References Cited

U.S. PATENT DOCUMENTS

| | | | |
|---|---|---|---|
| 1,395,668 | 11/1921 | Drill . | |
| 1,585,141 | 5/1926 | Foote | 74/701 |
| 2,353,554 | 7/1944 | Gates | 74/665 T |
| 2,377,354 | 6/1945 | Merritt | 74/701 X |
| 2,570,191 | 10/1951 | Beckwith | 74/694 |
| 2,648,236 | 8/1953 | Wilson | 74/694 |
| 2,692,514 | 10/1954 | O'Leary | 74/674 |
| 2,737,829 | 3/1956 | Wilson | 74/714 |
| 2,950,634 | 8/1960 | Clark et al. | 74/682 X |
| 3,044,320 | 7/1962 | Oudry | 74/710.5 |
| 3,107,763 | 10/1963 | Hill | 74/710.5 |
| 3,323,389 | 6/1967 | Hause | 74/710.5 |
| 3,377,885 | 4/1968 | Tuck et al. | 74/705 |
| 3,405,574 | 10/1968 | Livezey | 74/705 X |
| 3,425,296 | 2/1969 | Livezey | 74/720.5 |
| 3,535,954 | 10/1970 | Chambers et al. | 74/720.5 |
| 3,538,790 | 11/1970 | Polak | 74/720.5 |
| 3,631,944 | 1/1972 | Courtenay et al. | 74/710.5 |
| 4,073,358 | 2/1978 | Szalai | 74/710 |

FOREIGN PATENT DOCUMENTS

| | | |
|---|---|---|
| 807390 | 6/1951 | Fed. Rep. of Germany ........ 74/665 GA |
| 1480672 | 10/1969 | Fed. Rep. of Germany ........ 74/700 |
| 953383 | 12/1949 | France ................... 74/674 |
| 1106516 | 12/1955 | France ................... 74/710 |
| 1158608 | 6/1958 | France ........................ 74/655 GA |
| 89475 | 6/1921 | Switzerland ..................... 74/665 T |

OTHER PUBLICATIONS

Chironis, Nicholas P., *Mechanisms, Linkages, and Mechanical Controls,* McGraw-Hill, N.Y., 1965, p. 249 & p. 251.
ZF-Zweigang Wendetriebwerk HST 210.
*Gear Trains* H. E. Merritt, pp. 164–167, 1947.

*Primary Examiner*—Lawrence J. Staab
*Assistant Examiner*—Joseph M. Rolnicki
*Attorney, Agent, or Firm*—Charles E. Lanchantin, Jr.

[57] ABSTRACT

A multi-speed planetary differential (10) for a vehicle or the like is disclosed which has first and second interconnected planetary gear sets (12,14) with first and second output members (18,20) individually connected to first ones of the elements (26,28,30,34,36,38) of the respective planetary gear sets (12,14). Second ones of the elements (26,28,30,34,36,38) of the planetary gear sets (12,14) are interconnected, and the remaining third one of the elements (34,36,38) of the second planetary gear set (14) is held stationary. Advantageously, planetary means (22) are provided for driving an input member (16) connected to the remaining third one of the elements (26,28,30) of the first planetary gear set (12) at either of two speeds. The planetary means (22) includes a third planetary gear set (46) compactly disposed on a common axis (24) with the first and second planetary gear sets (12,14), and the differential (10) continually drives the output members (18,20) at equal torque levels in each speed.

10 Claims, 2 Drawing Figures

MULTI-SPEED PLANETARY DIFFERENTIAL

CROSS REFERENCE TO RELATED APPLICATION

This application is a continuation-in-part of application Ser. No. 68,241 filed Aug. 20, 1979, now abandoned.

TECHNICAL FIELD

This invention relates generally to a differential for a vehicle cross drive or the like, and more particularly to a compact planetary differential for driving a pair of output members at equal torque levels while incorporating multi-speed capability and a speed ratio reduction.

BACKGROUND ART

While there are a large number of vehicles such as earthmoving tractors and military tanks that have utilized multi-speed cross drive transmissions, the transmissions have incorporated an excessive number of gears and associated elements, and have generally been overly complex and costly in construction. In some cases multiple speeds for the driving ground-engaging members have been achieved by merely duplicating a plurality of planetary sets and operating brakes and clutches on the left and right sides, with such brakes and clutches controlling one or more reaction members independently of the operation on the opposite side of the vehicle.

Another deficiency with prior cross drive mechanisms is that the rotating members thereof have been arranged on a plurality of transverse axes so that the construction was not only costly, but also required an excessively large housing for containment of the components.

Still another deficiency is that such cross drive transmissions have not simultaneously provided a true differential function wherein the driving torques at the opposite sides of the vehicle are continuously equalized. For example, differential steering mechanisms have heretofor been proposed which force one output member to increase in speed while simultaneously forcing the opposite output member to decrease in speed by acting on one element of a pair of oppositely disposed planetary sets. This is achieved by a cross shaft or bevel gear drive connection between such elements and separate from the input drive that interferes with the true differential function and causes unequal torques to be imposed upon the opposite output members. Moreover, hydrostatic drive units have been employed for steering purposes in many of the earlier mechanisms, but the mixture of hydrostatic and mechanical drive unduly complicates the construction and requires an excessive amount of space.

One planetary differential is known which teaches a pair of interconnected planetary sets for driving a pair of oppositely disposed output members at substantially equal levels of torque while also desirably providing a speed reduction with respect to the input member. Such construction is set forth in U.S. Pat. No. 2,648,236 which issued to Wilson on Aug. 11, 1953. However, the Wilson embodiment having underdrive and direct drive modes of operation (FIG. 6) undesirably does not provide the desired speed ratio reduction in the direct drive mode.

Thus, what is needed is a durable and compact multi-speed differential having a true differential action in each speed, and a minimum number of components which can preferably be arranged along one transverse axis in a concentric manner. Preferably too, the multi-speed differential should be simple and economical to manufacture, and should incorporate a built-in speed ratio reduction or speed step down capability in each speed so that it can be relatively closely coupled to a driving engine without the need for an additional speed reduction gear train.

The present invention is directed to overcoming one or more of the problems as set forth above.

DISCLOSURE OF THE INVENTION

In one aspect of the present invention a compact planetary differential includes first and second planetary gear sets individually having ring, sun and carrier elements, a rotary input member, first and second output members individually connected to a preselected first one of the elements of the respective planetary sets, and with preselected second ones of the elements of the respective planetary sets being connected for joint rotation. The remaining third one of the elements of the first planetary set is connected to the input member, and the remaining third one of the elements of the second planetary set is held stationary. Advantageously, planetary means is provided for selectively driving the input member at either of two speeds and including a third planetary gear set disposed on a common axis with the first and second planetary gear sets. In either speed the output members are desirably driven at equal torque levels and at a reduction speed ratio.

The means to provide such multi-speed capability includes a brake assembly and a clutch assembly connected to preselected ones of the ring, sun and/or carrier elements of the third planetary gear set. It has been found to be particularly desirable, for example, to connect the sun elements of the first and second planetary sets for joint rotation and to connect the output members to the ring or carrier elements of the first and second planetary sets for joint rotation.

The compactness and simplicity of the interconnected planetary sets above described is particularly desirable in the cross drive of a fork lift truck, earthmoving vehicle or the like where space is at a premium. Basically, the planetary differential of the present invention is substantially concentrically aligned along a single transversely oriented axis so that the space and mounting complexities heretofor apparent with prior art multi-axes constructions have been obviated.

BEST MODE FOR CARRYING OUT THE INVENTION

Figure 1:
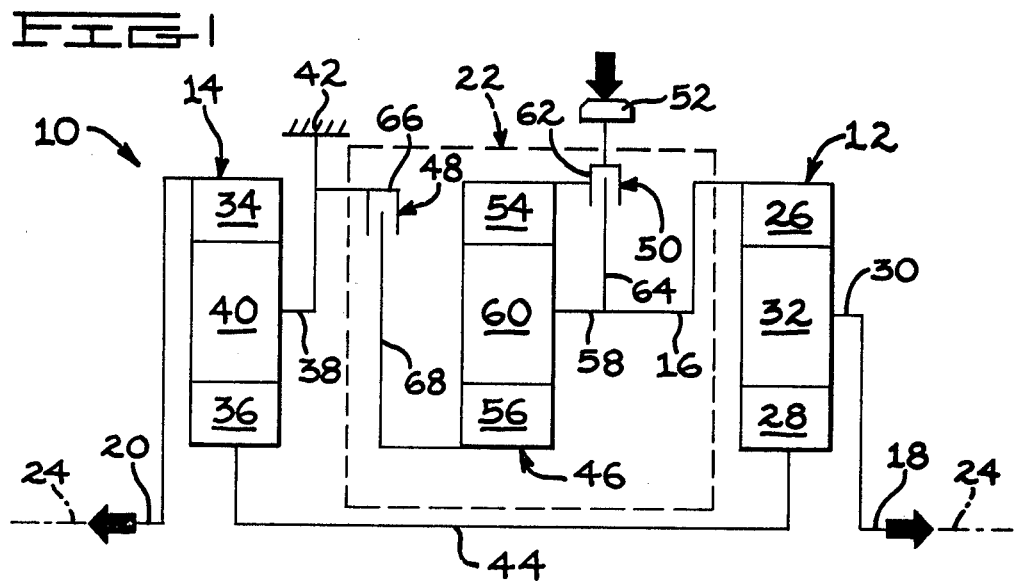
FIG. 1 is a diagrammatic, side elevational view of one embodiment of the multi-speed planetary differential of the present invention showing the planetary elements on only one side of the rotational axis for simplicity.

Referring initially to the diagrammatic drawing of FIG. 1, a multi-speed planetary differential 10 is shown in simplified form on one side of a rotational axis which has first and second interconnected planetary gear sets 12 and 14. A single rotary input member 16 provides the input power path to these two planetary gear sets, and first and second output members 18 and 20 provide the opposite output power paths. The differential includes planetary means 22 for selectively driving the input member at either of two speeds, while permitting the first and second planetary gear sets to drive the output members at equal levels of torque. These output members are substantially aligned on a vehicle cross drive axis 24 disposed normal to the usual forward and reverse direction of vehicle travel, and drive the usual ground-engaging members, not shown, such as a pair of oppositely disposed wheels. In the instant example the planetary means 22 is located between the first and second planetary gear sets and is concentrically aligned therewith on the rotational axis 24.

The first planetary gear set 12 includes first ring, sun and carrier elements 26,28 and 30 of the usual type wherein a plurality of similar planet elements 32 are rotatably mounted on the carrier element and are in intermeshing engagement with the ring and sun elements. In FIG. 1 the carrier element 30 is connected for joint rotation to the first or right output member 18. The second planetary gear set 14 also includes second ring, sun and carrier elements 34,36 and 38, and a plurality of planet elements 40 rotatably mounted in equally spaced peripheral relationship on the second carrier element 38. The second ring element 34 is connected for joint rotation to the second or left output member 20.

The second carrier element 38 is effectively continually grounded or held stationary with respect to a differential housing 42 as can be appreciated by reference to the embodiment illustrated in FIG. 1. Moreover, the first and second sun elements 28,36 are connected together for joint rotation by a cross shaft 44. And, in the broadest aspects of the construction illustrated, the planetary means 22 can provide either a low speed step or a high speed step to the input member 16 in a compact and economical manner.

More specifically, the planetary means 22 of FIG. 1 basically includes a third planetary gear set 46, a brake assembly 48, a clutch assembly 50, and an input transfer gear 52 concentrically supported by the housing 42 on the transverse axis 24 by suitable bearings, not shown, in a conventional manner. The third planetary gear set has third ring, sun and carrier elements 54,56 and 58 and a third plurality of planet elements 60 rotatably mounted on the third carrier element 58 and in meshing engagement with the third ring and sun elements. As can be noted from the drawing, third carrier element 58 is connected for joint rotation with both the input member 16 and the first ring element 26. Moreover, the clutch assembly 50 has a clutch housing 62 which is rotatably driven by the input gear 52 and is connected to rotate with the third ring element 54. Although not illustrated, the clutch assembly is preferably of the usual type having a plurality of interleaved clutch plates and discs and an annular piston for selectively clamping the plates and discs axially together. When actuated or engaged, to provide a high speed step, the clutch assembly 50 will effectively directly connect for joint rotation the third ring element 54 and the third carrier element 58 through one or more annular clutch members 64 connected to rotate with the third carrier element.

The brake assembly 48 is similar in construction to the clutch assembly in that it preferably has interleaved plates and discs and an annular actuating piston, not shown, for clamping the plates and discs together as a unit. Particularly, the brake assembly includes a stationary brake housing 66 connected, for example, to the stationary second carrier element 38 or to the differential housing 42. When the piston is actuated or when the brake assembly is engaged to provide a low speed step, a brake member 68 connected to the third sun element 56 is coupled to the stationary brake housing 66.

Figure 2:
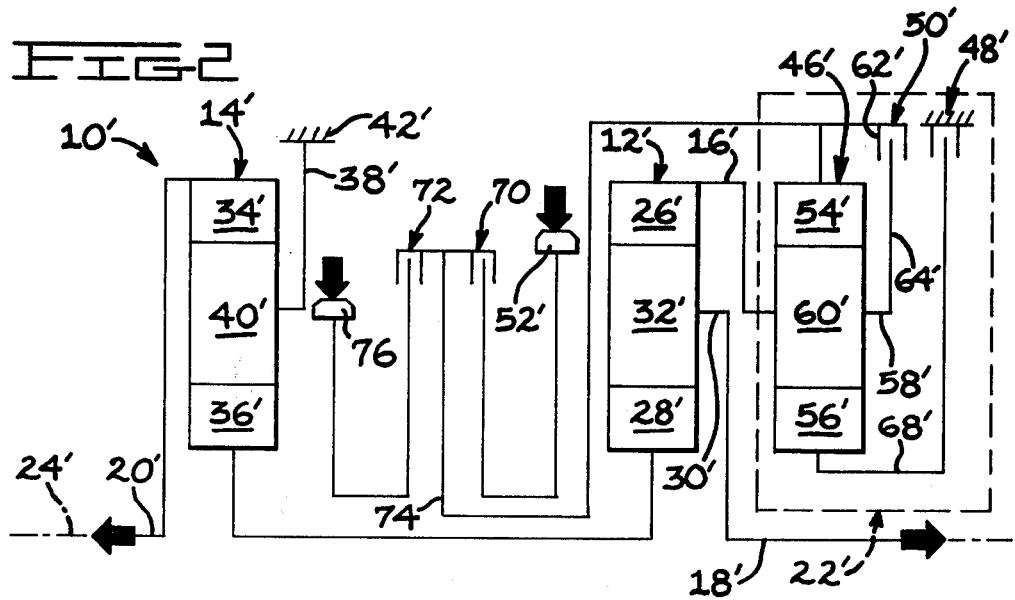
FIG. 2 is a diagrammatic, side elevational view similar to FIG. 1 only showing a second embodiment of the multi-speed planetary differential of the present invention.

A second multi-speed planetary differential 10' is illustrated diagrammatically in FIG. 2 which is a variation of the differential 10 shown in FIG. 1. Those elements common to the first embodiment are identified by similar reference numbers with an appended prime symbol. The differential 10' differs by having the third planetary gear set 46' on the outside of the first and second planetary gear sets 12' and 14' rather than between them. A further distinction is the incorporation of a dual set of input clutch assemblies 70 and 72 between the first and second planetary gear sets which permits two different input gear power paths to the planetary means 22'. More specifically, the first input clutch assembly 70 is effective when engaged to connect the input transfer gear 52' to the clutch housing 62' and third ring element 54' through a central rotary member 74. Alternately, the second input clutch assembly 72 is effective when engaged to connect a second input transfer gear 76 to the central rotary member 74 and to the clutch housing 62' and third ring element 54' for joint rotation. Since the gear 76 is of lesser diameter than the gear 52', and either can be easily connected to an associated transmission, not shown, it is apparent that two levels of gear reduction can be provided with the differential 10' prior to reaching the planetary means 22'.

In this regard, the full subject matter of parent application Ser. No. 68,241 is incorporated herein by reference.

Industrial Applicability

The multi-speed planetary differentials 10 and 10' are expected to find their greatest utility in a wheeled fork lift truck, automobile, or the like wherein the input transfer gears 52,52' and 76 are rotatably driven by an engine driven, intermediate transmission having directional change capability, not shown. Desirably, substantially equal levels of torque are delivered at all times to the opposite drive wheels by virtue of a preselected relationship between the first and second planetary gear sets 12 and 14. Such equal torque division provides directional stability while roading, and yet the differential function permits the right and left output members 18,20 to be operated at different rotational speeds in the same direction for vehicle turning or for wheel slippage under adverse traction conditions.

True differential action is obtained by establishing the number of teeth in the rotating elements of the first and second planetary gear sets 12,14 at preselected values. This is accomplished for simple planetary systems, wherein the planetary sets have only a single plurality of planetary gears, by selecting the ratio of the number of teeth of the ring element divided by the number of teeth of the sun element, hereinafter called the e value, such that the e value for the first planetary gear set 12 is equal to the e value for the second planetary gear set 14 minus one. For example, in FIG. 1 the number of teeth in the first planetary gear set ring and sun elements 26,28 can respectively be 72 and 36, which results in an e value of 2. The number of teeth in the second planetary gear set ring and sun elements 34,36 can be 72 and 24, which results in an e value of 3. Since the second carrier element 38 is stationary, if the input member 16 is driven at a preselected rotational speed then the first carrier element 30 and the second ring element 34 will rotate at one-third of such speed and in the same rotational direction as the input when viewing along the axis 24. Hence, a speed reduction ratio of 0.33 is achieved, and the output members 18,20 will individually provide an output torque level of 1½ times the input torque level to input member 16. The connected sun elements 28,36 will simultaneously rotate in a direction opposite that of the input member, and at the same speed as the input member.

Along with such relationship we can provide an e value of 2 for the third planetary gear set 46 by establishing 72 teeth, 36 teeth and 18 teeth for the ring, sun, ad planet elements 54,56 and 60 respectively. The low speed provision is achieved by disengaging the clutch assembly 50 and engaging the brake assembly 48. In such instance the third sun element 56 is fixed against rotation to provide a reaction. The transfer gear 52 is rotating with the third ring element 54 to provide the input, and the third carrier element 58 directly drives the input member 16 at a speed that is ⅔ that of the transfer gear. Alternately, high speed is accomplished by disengaging the brake assembly 48 and engaging the clutch assembly 50. In that mode of operation the third carrier element 58 is connected to rotate with the third ring element 54 so that the entire planetary gear set rotates as a unit for direct drive and an input to the first ring element 26 that is the same rotational speed as the transfer gear. Accordingly, the planetary means 22 can give an underdrive speed option or a direct drive speed option, with the rotational speed of the underdrive being about ⅔ that of the direct drive.

These or similar tooth ratios can be given for the FIG. 2 construction. In that construction the additional option of having either the transfer gear 52' or 76 provide the input path gives two speed reduction levels or steps via the respective gears that drive them, not shown, which is useful in combination with the underdrive and direct drive modes of operation of the planetary means 22' to effectively give 4 steps of multi-speed capability in a compact package.

Other aspects, objects and advantages of this invention can be obtained from a study of the drawings, the disclosure and the appended claims.

I claim:

1. In a planetary differential (10) including a first planetary gear set (12) having a first ring element (26), a first sun element (28) and a first carrier element (30), a second planetary gear set (14) arranged concentrically along a common transverse axis (24) with the first planetary gear set (12) and having a second ring element (34), a second sun element (36) and a second carrier element (38), the first and second sun elements (28,36) being connected for joint rotation, first and second output members (18,20) individually connected to one of the ring and carrier elements (26,30,34,38) of the respective planetary gear sets (12,14), a rotary input member (16) connected to the remaining one of the elements (26,30) of the first planetary gear set (12), and the remaining one of the elements (34,38) of the second planetary gear set 14 being held stationary, the improvement comprising:

planetary means (22) for selectively driving the input member (16) at either of two speeds and including a third planetary gear set (46) concentrically disposed on the common axis (24) with the first and second planetary gear sets (12,14) and having a third sun element (56), the planetary means (22) and first and second gear sets (12,14) continually driving the output members (18,20) at equal levels of torque and at a reduction speed ratio, and including brake means (48) for selectively holding the third sun element (56) stationary.

2. The planetary differential (10) of claim 1 wherein the input member (16) is connected for joint rotation with the first ring element (26).

3. The planetary differential (10) of claim 1 wherein the third planetary gear set (46) has a third ring element (54) and a third carrier element (58) and the planetary means (22) includes clutch means (50) for selectively connecting the third ring element (54) and third carrier element (58) for joint rotation.

4. The planetary differential (10) of claim 1 wherein the third planetary gear set (46) has a third carrier element (58) adaptable to rotate with the input member (16).

5. The planetary differential (10) of claim 1 wherein the second carrier element (38) is continually held stationary.

6. The planetary differential (10) of claim 1 wherein the third planetary gear set (46) has a carrier element (58) connected for joint rotation with the first ring element (26).

7. The planetary differential (10) of claim 1 including means (70,72) concentrically disposed on the axis (24) for selectively driving the planetary means (22) at either of two speeds.

8. In a planetary differential (10) including a first planetary gear set (12) having a first ring element (26), a first sun element (28) and a first carrier element (30), a second planetary gear set (14) arranged concentrically along a common transverse axis (24) with the first planetary gear set (12) and having a second ring element (34), a second sun element (36) and a second carrier element (38), first and second output members (18,20) individually connected to a preselected first one of the elements (26,28,30,34,36,38) of the respective planetary gear sets (12,14), a preselected second one of the elements (26,28,30) of the first planetary gear set (12) being connected for joint rotation to a preselected second one (34,36,38) of the elements of the second planetary gear set (14), a rotary input member (16) connected to the remaining third one of the elements (26,28,30) of the first planetary gear set, and the remaining third one of the elements (34,36,38) of the second planetary gear set (24) being held stationary, the improvement comprising:

planetary means (22) for selectively driving the input member (16) at either of two speeds and including a third planetary gear set (46) concentrically disposed on the common axis (24) outside of the first and second planetary gear sets (12,14), the planetary means (22) and first and second gear sets (12,14) continually driving the output members (18,20) at equal levels of torque and at a reduction speed ratio, and including a pair of input transfer gears (52',76) and rotating clutch means (70,72,74) for selectively connecting one of the input transfer gears (52',76) to the planetary means (22).

9. In a planetary differential (10) including a first planetary gear set (12) having a first ring element (26), a first sun element (28) and a first carrier element (30), a second planetary gear set (14) arranged concentrically along a common transverse axis (24) with the first planetary gear set (12) and having a second ring element (34), a second sun element (36) and a second carrier element (38), first and second output members (18,20) individually connected to a preselected first one of the elements (26,28,30,34,36,38) of the respective planetary gear sets (12,14), a preselected second one of the elements (26,28,30) of the first planetary gear set (12) being connected for joint rotation to a preselected second one (34,36,38) of the elements of the second planetary gear set (14), a rotary input member (16) connected to the remaining third one of the elements (26,28,30) of the first planetary gear set, and the remaining third one of the elements (34,36,38) of the second planetary gear set (24) being held stationary, the improvement comprising:

planetary means (22) for selectively driving the input member (16) at either of two speeds and including a third planetary gear set (46) concentrically disposed on the common axis (24), the planetary means (22) and first and second gear sets (12,14) continually driving the output members (18,20) at equal levels of torque and at a reduction speed ratio and including a pair of rotating clutches (70,72) concentrically disposed on the axis (24) between the first and second planetary gear sets (12',14').

10. A planetary differential (10) comprising:

a first planetary gear set (12) including a first ring element (26), a first sun element (28), a first carrier element (30), and a first plurality of planet elements (32) connected to the first ring element (26) and the first sun element (28) and carried by the first carrier element (30);

a second planetary gear set (14) including a second ring element (34), a second sun element (36), a second carrier element (38), and a second plurality of planet elements (40) connected to the second ring element (34) and the second sun element (36) and carried by the second carrier element (38), said first sun element (28) being connected for joint rotation with said second sun element (36);

means (42) for holding the second carrier element (38) stationary; and planetary means (22) for selectively providing two speed ranges of input drive to the first ring element (26) of the first planetary gear set (12), the planetary means (22) sharing a common axis (24) with the first and second planetary gear sets (12,14) and including a third sun element (56) and brake means (48) for selectively holding the third sun element (56) stationary.

* * * * *